(12) United States Patent
Parker et al.

(10) Patent No.: US 7,633,933 B2
(45) Date of Patent: Dec. 15, 2009

(54) SYSTEMS AND METHODS FOR A HIERARCHICAL LAYER ONE AND LAYER TWO CROSS-CONNECT IN A TRANSPORT AND AGGREGATION PLATFORM

(75) Inventors: Ronald M. Parker, Boxborough, MA (US); John P. Jones, Westford, MA (US); Chris Munford, Wayland, MA (US)

(73) Assignee: Ciena Corporation, Linthicum, MD (US)

( * ) Notice: Subject to any disclaimer, the term of this patent is extended or adjusted under 35 U.S.C. 154(b) by 500 days.

(21) Appl. No.: 11/699,250

(22) Filed: Jan. 29, 2007

(65) Prior Publication Data
US 2008/0181608 A1 Jul. 31, 2008

(51) Int. Cl.
H04L 12/26 (2006.01)
(52) U.S. Cl. ...................................... 370/352
(58) Field of Classification Search ........................ None
See application file for complete search history.

(56) References Cited

U.S. PATENT DOCUMENTS

| 7,492,714 B1 * | 2/2009 | Liao et al. .................... 370/235 |
| 2003/0227906 A1 * | 12/2003 | Hallman ...................... 370/352 |
| 2007/0177662 A1 * | 8/2007 | Jain et al. .................... 375/222 |

* cited by examiner

Primary Examiner—Anh-Vu Ly
(74) Attorney, Agent, or Firm—Clements Bernard PLLC; Christopher L. Bernard; Tyler S. Brown (57) ABSTRACT

The present invention provides systems and methods to effectively combine layer one and layer two cross-connects in a hierarchical fashion. The present invention combines layer one and layer two cross-connects between a layer one (L1) line card and a layer two (L2) line card in a transport and aggregation platform. Advantageously, the present invention provides network operators increased flexibility and capability in transport and aggregation networks. Particularly, transport networks tend to contain only layer one capabilities. The present invention makes the introduction of layer two functionality into transport networks practical because an entire physical connection need not be dedicated to all layer one cross-connects or all layer two cross-connects.

13 Claims, 9 Drawing Sheets

SYSTEMS AND METHODS FOR A HIERARCHICAL LAYER ONE AND LAYER TWO CROSS-CONNECT IN A TRANSPORT AND AGGREGATION PLATFORM

FIELD OF THE INVENTION

The present invention relates generally to communications networks, such as transport and aggregation networks. More specifically, the present invention relates to systems and methods for a hierarchical layer one (L1) and layer two (L2) cross-connect in a transport and aggregation platform.

BACKGROUND OF THE INVENTION

Multi-service transport and aggregation platforms are capable of supporting any transport protocol, such as Time Division Multiplexing (TDM), Ethernet, storage, video, and the like, on any available port on a line card. Such platforms can include user-programmable line ports, allowing services of up to 10 Gbps to be provisioned, upgraded, or changed through software.

For example, a transport and aggregation platform can be configured to utilize ITU G.709 standards-based technology (also known as Digital Wrapper). The platform can groom multiple optical services running on any port onto higher-speed wavelengths. These higher-speed wavelengths, such as an Optical Transmission Unit of level 1 (OTU1) (2.7 Gbps) or an Optical Transmission Unit of level 2 (OTU2) (10.7 Gbps) signals, carry any mix of individual services up to 10 Gbps. Standards-based protocols supported can include: 10/100/1000 Ethernet, 10 Gbps Ethernet, OC-3/12/48/192, or STM1/4/16/64, FC/FICON, ESCON, OTU1, OTU2, etc.

In communications networks, such as transport and aggregation networks, current systems and methods include L1 cross-connects typically in transport-oriented devices like Digital Cross-connect Systems (DCSs) and Add-Drop Multiplexers (ADMs), and L2 cross-connects (i.e., Virtual Local Area Network (VLAN) cross-connects) in multi-service switches (MSSs) and SONET Multi Service Provisioning Platforms (MSPPs). With current techniques, a physical connection must terminate on an L1 switching card or on an L2 switching card. This reduces flexibility and makes network planning more difficult.

A traditional transport and aggregation platform has a fixed relationship between client port bandwidth and transport network port bandwidth. For example, a Gigabit Ethernet (GbE) client port consumes exactly 1 Gb of transport or Optical Transport Network (OTN) bandwidth. Given a limit of 10 Gbps of bandwidth per wavelength and the mapping of GbEs into Virtual Concatenation Groups (VCGs), where a VCG is a collection of one to sixteen 155 Mbps timeslots contained in an OTU1, a single-wavelength transport and aggregation network can only carry eight GbE clients. To carry more than eight GbE clients, one must stack on additional transport and aggregation platforms and add a wavelength to the network for every eight additional GbE clients. The lack of scale in this solution can cause the cost and complexity of the total network solution to be unacceptable for a service provider. Especially when those GbEs are underutilized.

Further, traditional transport and aggregation platforms cannot deliver service to Ethernet ports of different speeds. In other words, one cannot connect a Fast Ethernet (FE) client to a GbE client, nor a GbE client to a 10 GbE client, etc. Systems and methods are thus needed to effectively combine L1 and L2 cross-connects in a transport and aggregation platform.

BRIEF SUMMARY OF THE INVENTION

In various exemplary embodiments, the present invention provides systems and methods that effectively combine layer one and layer two cross-connects in a hierarchical fashion. The present invention combines layer one and layer two cross-connects between a layer one (L1) line card and a layer two (L2) line card in a transport and aggregation platform. For example, a physical connection can still terminate on the L1 line card, but portions of that connection may be internally routed (e.g., through a backplane) to the L2 line card for additional processing. An example of a physical connection includes a channelized OTU2 carrying 64 time slots of 155 Mbps each, for an aggregate of approximately 10 Gbps. By terminating the physical OTU2 to a line card capable of performing L1 cross-connects at each of the 64 time slots, flexibility is greatly increased by allowing any particular time slot to be cross-connected to another port at L1, or to an L2 card for further processing. The L2 card, in turn, can cross-connect a portion of the time slot (i.e., a particular VLAN) to a different L1 time slot terminated anywhere within the node, to a physical port on itself, or to a physical port on another L2 card.

Advantageously, the present invention provides network operators with increased flexibility and capability in transport and aggregation networks. Particularly, transport networks tend to contain only L1 capabilities. The present invention makes the introduction of L2 functionality into transport networks practical because an entire physical connection need not be dedicated to all L1 cross-connects or all L2 cross-connects.

The present invention, with the ability to switch at L2 and even oversubscribe, allows flexible mappings between Ethernet Clients (10/100/1000/10 G) and the transport network, such that an unlimited number of Ethernet clients can share a single wavelength. This allows attachment for a virtually unlimited number of Ethernet clients to a transport and aggregation network without the need to increase the number of wavelengths or stack platforms.

In an exemplary embodiment of the present invention, a hierarchical layer one and layer two cross-connect in a transport and aggregation platform includes a layer one line card including a plurality of ports and a layer one cross-connect configured to cross-connect a plurality of time slots, a layer two line card including a plurality of ports and a layer two cross-connect configured to cross-connect a portion of one or more of the plurality of time slots to another of the plurality of time slots or to one of the plurality of ports on the layer two line card, and a connection between the layer one line card and the layer two line card. Optionally, the hierarchical layer one and layer two cross-connect also includes a second layer two line card including a second plurality of ports and a second layer two cross-connect configured to cross-connect a portion of one or more of the plurality of time slots to another of the plurality of time slots, to one of the second plurality of ports on the second layer two line card, or to one of the plurality of ports on the layer two line card, wherein the second layer two line card connects to the layer one line card and the layer two line card through the connection. The layer two line card further includes an OTU1 or OUT2 port for transporting aggregated, shaped Ethernet traffic. The plurality of ports are configured to transmit and receive any of Ethernet signals including 10/100/1000Base-TX, 100Base-FX, 1000Base-SX/LX/EX/CWDM, 10 GBase-SX/LX/EX/CWDM (including LAN or WAN PHY) with the same hardware. The layer one line card is configured to send and receive a portion of the plurality of time slots to the layer two line card. The layer two line card encapsulates Ethernet frames into a Generic Framing Procedure—Frame. The layer one line card maps a plurality of time slots and one or more Generic Framing Procedure—Frames into an Optical Transport Network payload. The Optical Transport Network payload includes one of an Optical Transmission Unit of level 1 or an Optical Transmission Unit of level 2. Alternatively, the layer two line card is configured to send and receive traffic to and from a Virtual Concatenation Group residing in one of the plurality of ports on the layer one line card. The Virtual Concatenation Group includes one to sixteen timeslots.

In another exemplary embodiment of the present invention, a method of performing hierarchical layer one and layer two cross-connects in a transport and aggregation platform includes terminating a physical connection comprising a plurality of time slots, cross-connecting the plurality of time slots at layer one, routing a portion of one or more of the plurality of time slots to a layer two card, and cross-connecting the portion of one or more of the plurality of time slots at layer two. The method also includes encapsulating the portion of one or more of the plurality of time slots into a Generic Framing Procedure—Frame. Optionally, the method further includes aggregating the Generic Framing Procedure—Frame into a channelized Optical Transmission Unit of level 1 or of level 2. The physical connection includes a Virtual Concatenation Group comprising one to sixteen of the plurality of timeslots.

In a further exemplary embodiment of the present invention, a transport and aggregation platform utilizing a hierarchical layer one and layer two cross-connect includes a backplane for connecting line cards together; a layer two line card including a connection to the backplane, a plurality of client ports, a layer two cross-connect, and a layer one interface; and a layer one card including a connection to the backplane, a plurality of flexible protocol and rate client ports, and a layer one cross-connect. The layer one card is configured to transmit and receive a plurality of times slots on the plurality of flexible protocol and rate client ports, and perform switching of the time slots and layer two, and further the layer one cross-connect is configured to route portions of one or more of the plurality of time slots through the backplane to the layer one interface. The layer two card is configured to switch layer two signals from the plurality of client ports on the layer two card and layer two signals from the portions of one or more of the plurality of time slots to another portion of one or more of the plurality of time slots or to another of the plurality of client ports on the layer two card.

BRIEF DESCRIPTION OF THE DRAWINGS

The present invention is illustrated and described herein with reference to the various drawings, in which like reference numbers denote like system components and/or method steps, respectively, and in which.

DETAILED DESCRIPTION OF THE INVENTION

In various exemplary embodiments, the present invention provides systems and methods that effectively combine layer one and layer two cross-connects in a hierarchical fashion. The present invention combines layer one and layer two cross-connects between a layer one (L1) line card and a layer two (L2) line card in a transport and aggregation platform. For example, a physical connection can still terminate on the L1 line card, but portions of that connection may be internally routed (e.g., through a backplane) to the L2 line card for additional processing. An example of a physical connection includes a channelized OTU2 carrying 64 time slots of 155 Mbps each, for an aggregate of approximately 10 Gbps. By terminating the physical OTU2 to a card capable of performing L1 cross-connects at each of the 64 time slots, flexibility is greatly increased by allowing any particular time slot to be cross-connected to another port at layer one or to a L2 card for further processing. The L2 card, in turn, can cross-connect a portion of the time slot (i.e., a particular VLAN) to a different layer one time slot terminated anywhere within the node, to a physical port on itself, or to a physical port on another L2 card.

The hierarchical L1/L2 cross-connect of the present invention utilizes Ethernet-centric port cards in a transport and aggregation platform which are capable of L2 packet switching. These port cards can communicate to L1 port cards which are capable of L1 cross-connecting. In a hierarchical fashion, the Ethernet-centric port cards and the L1 port cards form a L1/L2 cross-connect within a transport and aggregation platform that allows network operators to efficiently transport L1 and L2 traffic without requiring expensive aggregation devices or the like. The present invention supports Ethernet multiplexing allowing service delivery between Ethernet clients of many speeds and types (10BaseT, 100BaseT, 1000BaseT, 100FX, GbE Optical, 10 GbE, and the like).

Generic Framing Procedure—Frame (GFP-F), as defined by ITU-T G.7041, encapsulates complete Ethernet, r other types of, frames with a GFP header. GFP-F is key to the hierarchical L1/L2 approach, with the Ethernet-centric port card sending and receiving traffic to/from a VCG that resides in a port on the L1 port card. When this is done, the Ethernet frames are first encapsulated in GFP-F and then mapped into an OTN (e.g., OTU1/OTU2) payload, as appropriate. The GFP-F is primarily responsible for frame delineation. In this regard, it is very similar to a 10 GbE WAN-PHY approach, where Ethernet is encapsulated into GFP-F and then mapped into a SONET OC-192c payload. However, the 10 GbE WAN-PHY approach is single rate (OC-192c payload), whereas the present invention supports any VCG size from 1-16 timeslots and can be extended to support a clear-channel OTU2.

The present invention provides the ability to switch at L2 and even oversubscribe, to allow flexible mappings between Ethernet Clients (10/100/1000/10 G) and the transport network, such that an unlimited number of Ethernet clients can share a single wavelength. This allows attachment for a virtually unlimited number of Ethernet clients to the transport and aggregation network without the need to increase the number of wavelengths or stack platforms.

Additionally, the present invention allows multiple point-to-point connections to be created from the same physical port. Existing transport and aggregation platforms today only connect a single client port to exactly one other client port in the network. The present invention allows multiple connections originating at a single port. This is important in "client-server" type networks typical of a service provider environment (i.e., Internet access).

Figure 1A:
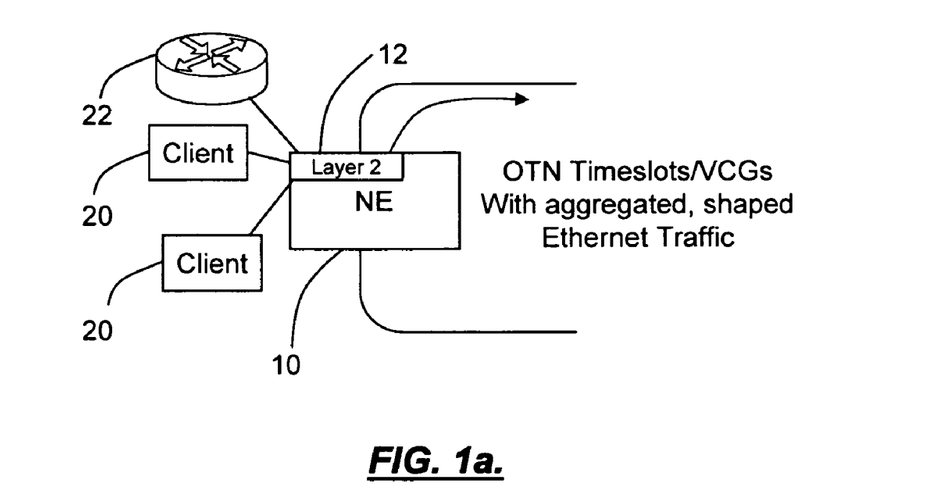
FIGS. 1a-1b illustrate transport and aggregation network elements (NEs) including layer two hierarchical cross-connects according to an exemplary embodiment of the present invention.
Figure 1B:
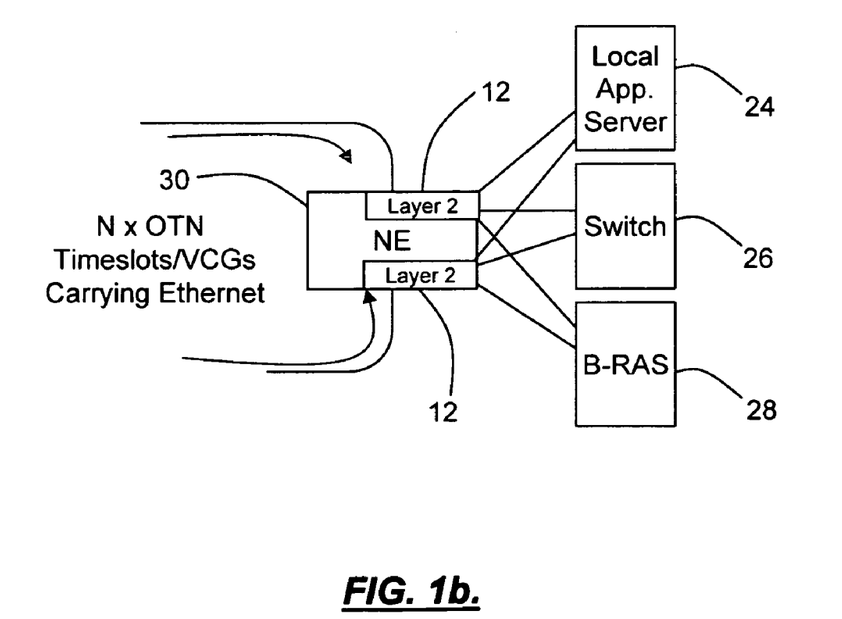

Referring to FIGS. 1a-1b, in an exemplary embodiment of the present invention, transport and aggregation network elements (NE) 10,30 include layer two hierarchical cross-connects 12. FIG. 1a illustrates a client aggregation network element 10 configured to provide an "on-ramp" to multiple clients 20,22. The NE 10 connects to clients 20, a router/switch 22, and the like through port cards, such as multiple port small-form factor pluggables (SFP). The NE 10 is configured to aggregate the clients 20, router/switch 22, and the like into the OTN/transmission domain, i.e. layer one cross-connect. The present invention provides the ability to route the layer one traffic to the layer two cross-connect 12 in a hierarchical fashion as described further herein. The layer two cross-connect 12 is configured to forward shaped traffic from the attached devices 20,22 to VCGs/timeslots. Additionally, the cross-connect 12 can be configured to provide policing on the ingress and shaping into right-sized VCGs. The result allows the NE 10 to transmit OTN timeslots and VCGs with aggregated, shaped Ethernet traffic. Advantageously, this removes the need to include Ethernet switches and the like as a front-end to the NE 10 for Ethernet cross-connects.

FIG. 1b illustrates a high-capacity head-end transport and aggregation NE 30 configured to provide an "off-ramp" to devices such as a local application server 24, switch 26, and broadband remote access switch (B-RAS) 28. The NE 30 includes two L1/L2 hierarchical cross-connects 12, and is configured to cross-connect the incoming OTN timeslots and VCGs carrying Ethernet traffic through connections, such as GbE, 10 GbE, or the like, to the devices 24,26,28.

Figure 2A:
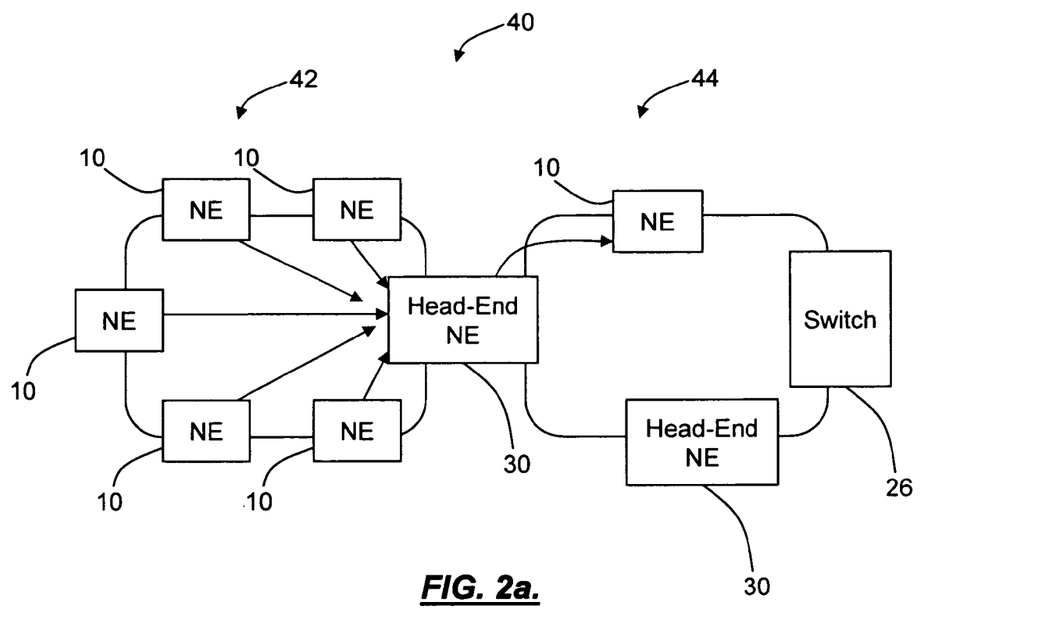
FIGS. 2a-2b illustrate a transport and aggregation network for providing aggregation, transport, and bridging of multiple NEs at layer one and layer two, and a head-end NE configured to aggregate, transport, and bridge multiple NEs and clients together and to other NEs, according to an exemplary embodiment of the present invention.
Figure 2B:
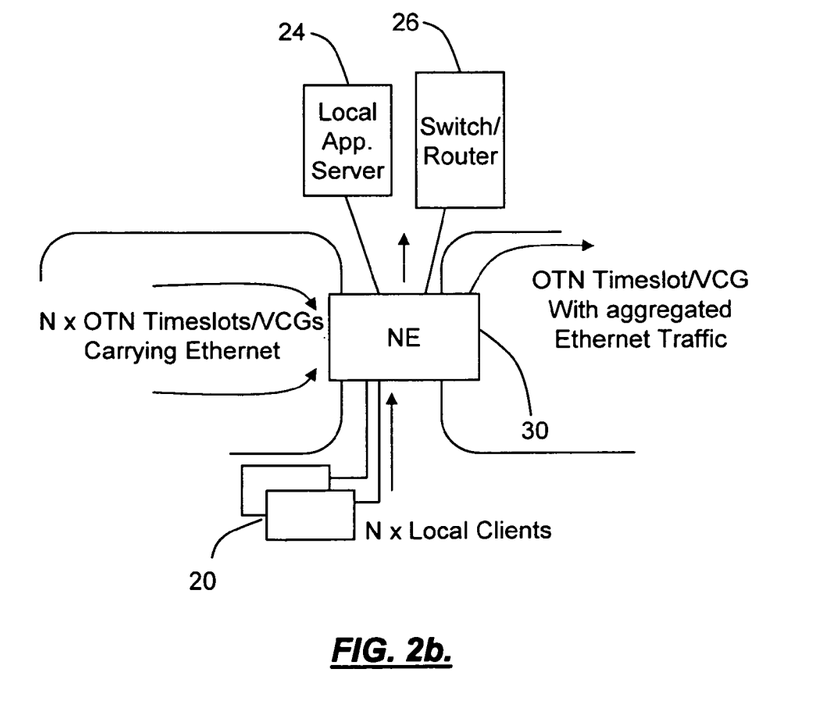

Referring to FIGS. 2a-2b, in an exemplary embodiment of the present invention, a transport and aggregation network 40 provides aggregation, transport, and bridging of multiple network elements at layer one and layer two, and a head-end NE 30 can also aggregate, transport, and bridge multiple network elements and clients together and to other NEs 10,30. FIG. 2a illustrates the network 40 which includes a first network 42 including multiple NEs 10, and a second network 44 including an NE 10, a switch 26, and a head-end NE 30, with the two networks 42,44 sharing a head-end NE 30 configured to bridge the networks 42,44 together. The NEs 10 in network 42 are configured to aggregate layer one and layer two traffic with the hierarchical cross-connect of the present invention into VCGs from remote terminals and end-office equipment, and to forward upstream into aggregate VCGs. The NE 30 includes the hierarchical cross-connect of the present invention, and is configured to bridge OTN timeslots/VCGs with aggregated Ethernet traffic to the devices 10,26,30 in network 44.

FIG. 2b illustrates another head-end NE 30 configured to aggregate, transport, and bridge multiple devices together at layer one and layer two. The NE 30 is connected to local devices, such as the local application server 24, switch/router 26, an multiple local clients 20, for layer one and layer two aggregation and transport. Further, the NE 30 is configured to transport remotely to other NEs 10,30, forwarding OTN timeslots/VCGs with aggregated Ethernet.

Figure 3:
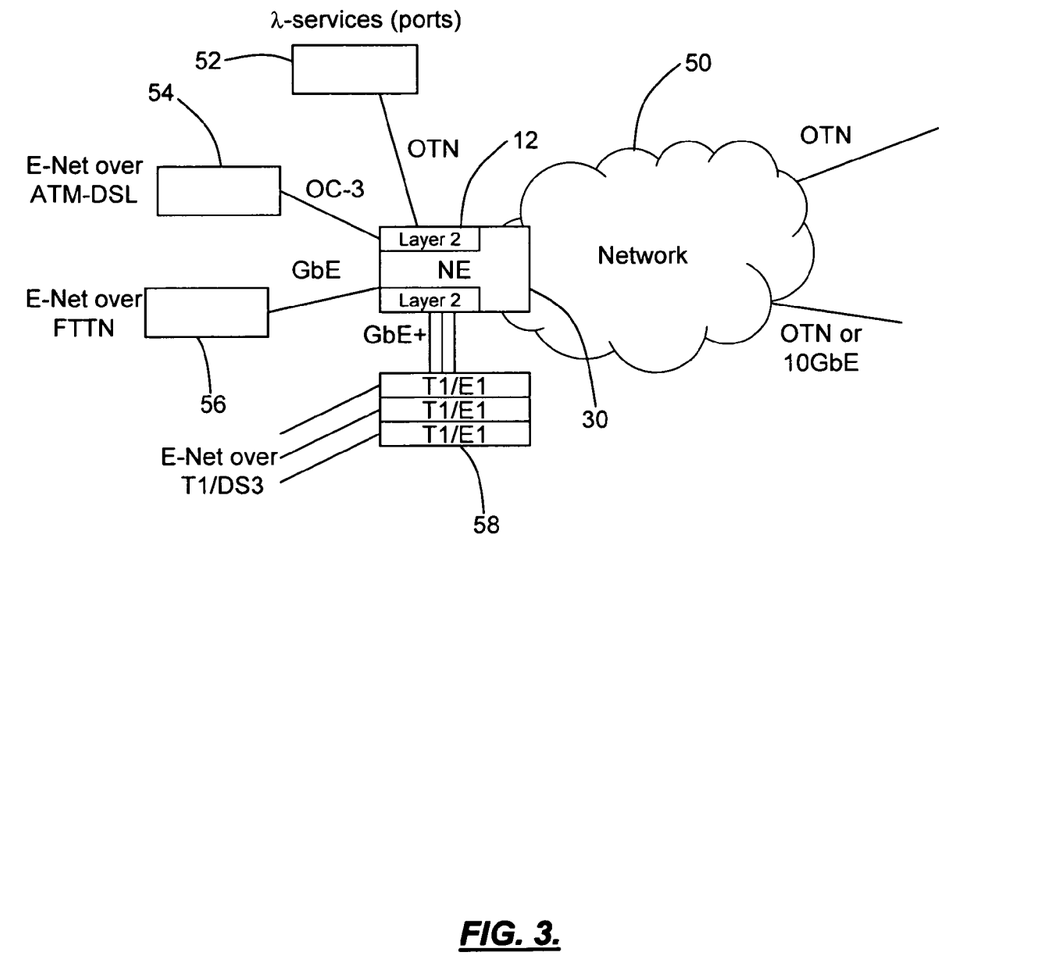
FIG. 3 illustrates a transport and aggregation NE configured with the hierarchical layer one/layer two cross-connect of the present invention to provide the ability to manage layer one wavelength services port-to-port and layer two services end-to-end.

Referring to FIG. 3, the hierarchical L1/L2 cross-connect of the present invention provides the ability to manage layer one wavelength services port-to-port and layer two services end-to-end with a single transport and aggregation network element 30. As described herein, the NE 30 includes client ports, such as multiple port small-form factor pluggables (SFP). Further, the client ports can include flexible rate ports which are capable of a plurality of protocols and bit rates solely with software provisioning. The client ports on the NE 30 can connect to multiple devices, such as a network element 52 providing a wavelength service not at layer two (e.g. OTN interface to the client port), Ethernet over ATM from a digital subscriber loop access multiplexer (DSLAM) (e.g. OC-3 interface to the client port), Ethernet over fiber to the node (FTTN) 56 (e.g., GbE interface to the client port), Ethernet over T1/DS3s/E1s 58 (e.g., GbE interface to the client port), and the like.

The NE 30 can be part of a network 50 including other NEs 30 as well as other devices, such as switches, routers, BRAS, and the like. Advantageously, the NE 30 provides a single platform for transport and aggregation to combine layer one and layer two services, allowing OTN and 10 GbE aggregation. Further, the network elements can include control through session management, such as Session Initiation Protocol (SIP).

Figure 4:
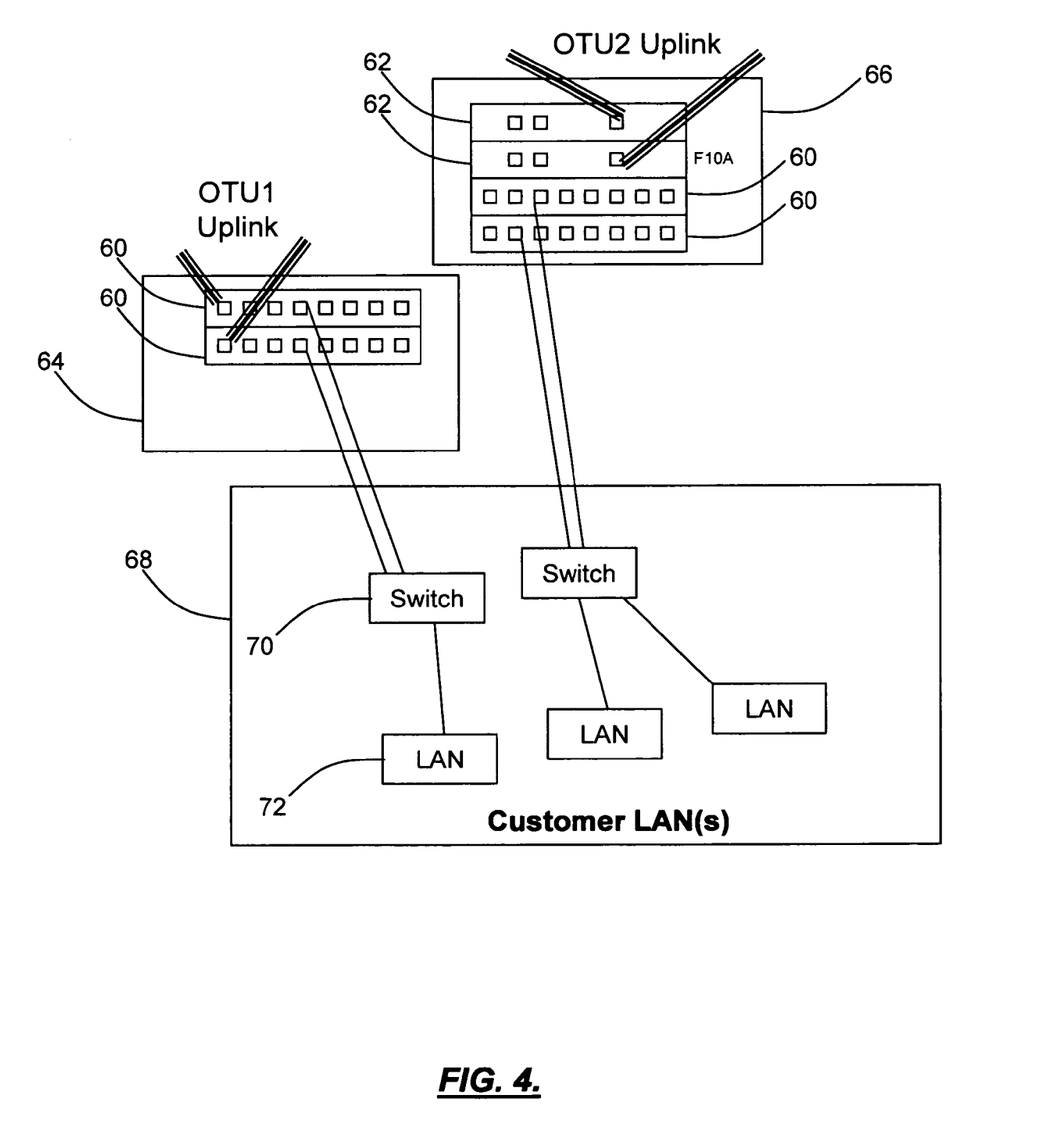
FIG. 4 illustrates line modules in an exemplary embodiment of the present invention configured with flexible ports and the hierarchical layer one/layer two cross-connect connected to switches for aggregation and transport of multiple customer local area networks (LANs).

Referring to FIG. 4, in an exemplary embodiment of the present invention, a line module 60 configured with flexible ports and including a hierarchical layer one/layer two cross-connection can be configured to interface to switches 70 to aggregate and transport multiple customer local area network (LAN) 72 connections. For example, the line modules 60 can connect to a remote terminal, end-office, or on-premises 64, or to an end office or central office 66. The line module 60 is configured to operate in a transport and aggregation platform. The line module 60 can include an uplink port, such as an OTU1 port. Additionally, an uplink module 62 can provide additional uplink ports, such as an OTU2 port, and can communicate to the line module 60 through a backplane.

The line modules 60 can connect to the switch 70 through a GbE connection or the like. The line modules 60 are configured to provide both layer one and layer two cross-connects in a hierarchical fashion. The line modules 60 can be configured to support IEEE 802.3ah Ethernet in the First Mile (EFM) management to the final demarcation device, and IEEE 802.1ag per flow Operations, Administration & Maintenance (OAM) for robust layer two Fault, Configuration, Accounting, Performance, Security (FCAPs).

Figure 5:
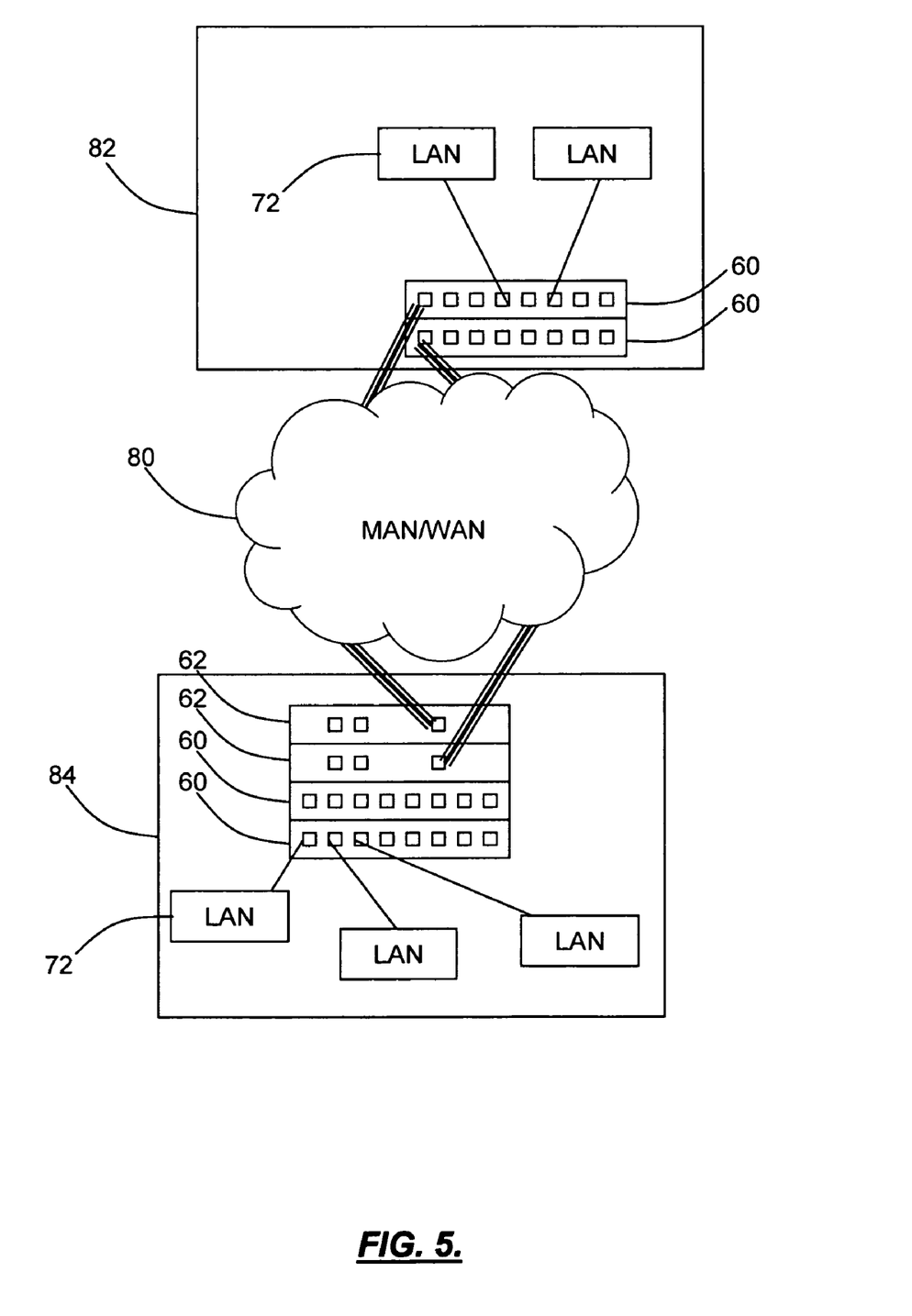
FIG. 5 illustrates line modules configured to support high-end business Ethernet services between customer premises through a metropolitan or wide area network (MAN/WAN) to aggregate multiple LANs.

Referring to FIG. 5, the line modules 60 can be configured to support high-end business Ethernet services between customer premises 82,84 through a metropolitan or wide area network (MAN/WAN) 80 to aggregate multiple LANs 72. The line modules 60 can support comprehensive performance monitoring and service level agreement (SLA) enforcement.

Further, the line modules 60 can support media access control in media access control (MAC-in-MAC) for scalability and separation of customer traffic.

Figure 6:
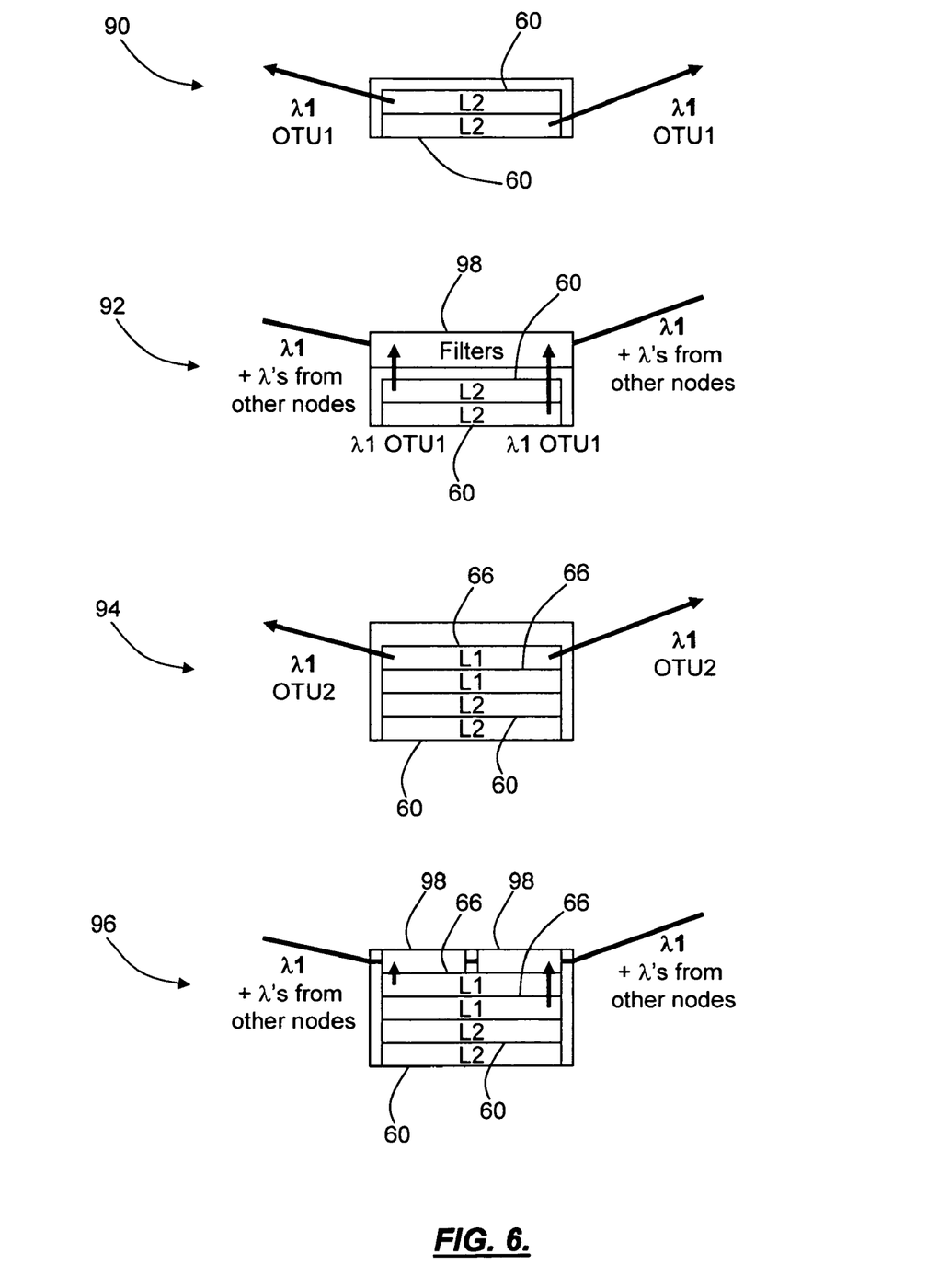
FIG. 6 illustrates exemplary embodiments of lines cards with the hierarchical L1/L2 cross-connect of the present invention in various example chassis deployments.

Referring to FIG. 6, exemplary embodiments of lines cards 60, 66 including the hierarchical L1/L2 cross-connect of the present invention are depicted in various example chassis deployments. The line cards 60,66 can include multiple client ports, such as flexible, reconfigurable ports capable of a plurality of protocols and bit rates based on software configuration. In an exemplary embodiment, the line card 60 is a L2 line card including multiple ports, such as SFP, XFP, X2, XEN-PAK or the like, operable to transmit and receive a variety of Ethernet types with the same hardware, such as 10/100/1000Base-TX, 100Base-FX, 1000Base-SX/LX/EX/CWDM, 10 GBase-SX/LX/EX/CWDM (including LAN or WAN PHY). Additionally, the line card 60 can include uplink ports configured to transmit and receive aggregated Ethernet at a higher rate, such as OTU1.

The line card 66 is a L1 line card including multiple ports, such as SFP, XFP, or the like, operable to transmit and receive any signal up to 10 Gbps including a variety of protocols. The line card 66 can be a flexible rate and protocol card, meaning that each port can support a variety of protocols and bit rates up to 10 Gbps solely through software configuration. The line card 66 includes a Time Slot Interchange (TSI) layer one cross-connect. For example, the TSI cross-connect can be configured to perform layer one cross-connects across VCGs.

Node 90 includes two line cards 60 connected to a backplane. In this deployment, a since OTU1 wavelength is shared among multiple nodes 90 through VCG multiplexing. In node 90, the line cards 60 are configured to cross-connect a portion of a time slot (i.e., a particular VLAN) to a different L1 time slot terminated anywhere in the node 90, to a physical port on the same card 60, or to a physical port on another card 60. Node 92 illustrates the use of wavelength division multiplexing (WDM) or coarse-wavelength division multiplexing (CWDM) through the use of filters 98 included in the node 92 to increase the line bandwidth.

Node 94 includes two L1 line cards 66 and two L2 line card 60 connected in a single chassis through a backplane, such as an electrical or optical plane. Here, the L1 card 66 is configured to transmit and receive an OTU2, and to transmit and receive client signals at rates below OTU2 carrying L1 and L2 traffic. The L2 line cards 60 are configured to receive Ethernet signals. Node 96 includes the same components 60,66 as node 90 with the addition of filters 98 to allow for CWDM and WDM transmission.

In nodes 94,96, the L1 cards 66 and L2 cards 60 communicate to each other through both a packet bus and a TSI bus on the backplane. Each of the L1 cards 66 include a L1 cross-connect configured to switch VCGs, such as 155 Mbps timeslots, to any other timeslot within the card or within other L1 cards 66 in the node 94,96. Additionally, the L1 cards 66 can switch VCGs to L2 card 60 in the node 94,96 where additional L2 processing can occur.

Figure 7:
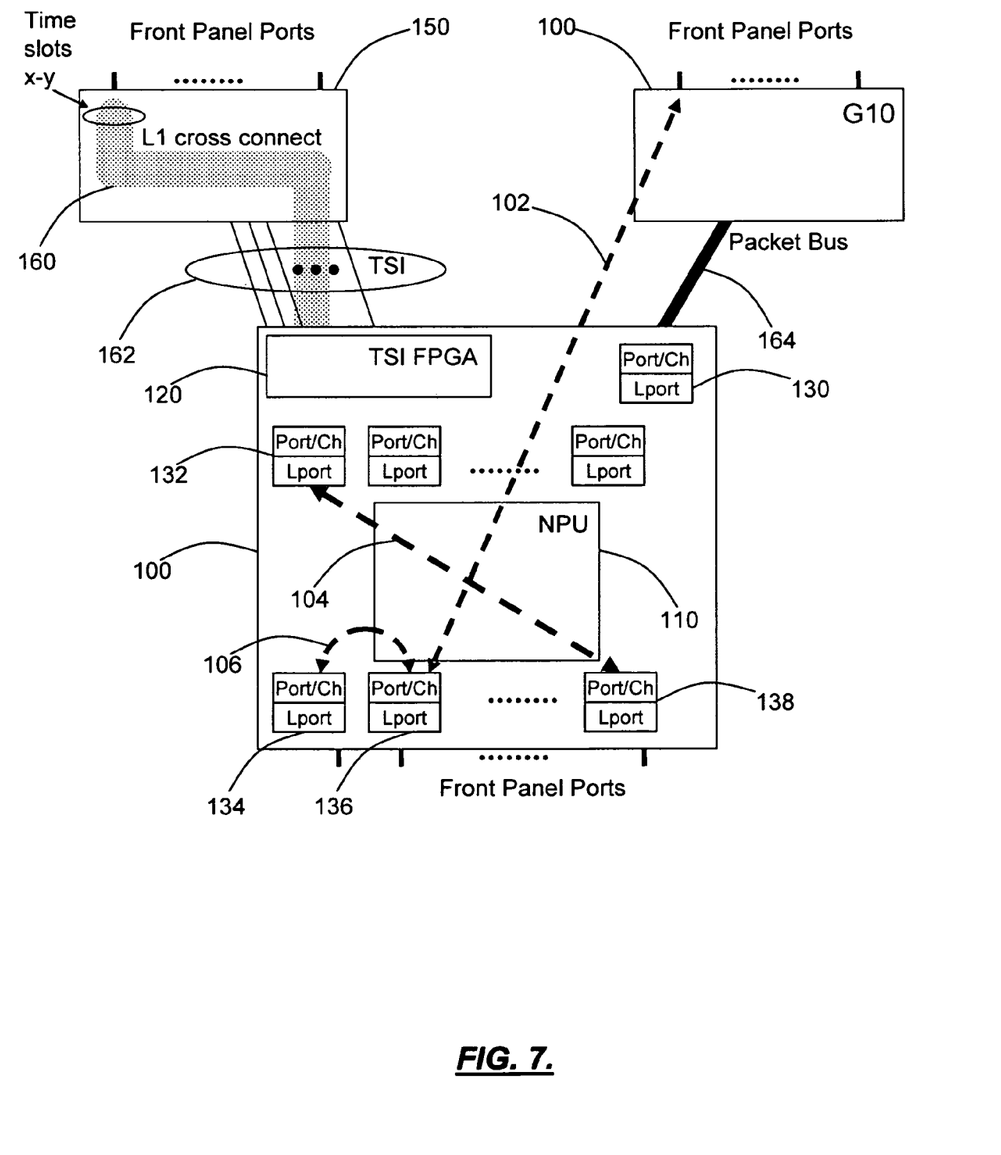
FIG. 7 illustrates an exemplary embodiment of the hierarchical L1/L2 cross-connect of the present invention.

Referring to FIG. 7, an exemplary embodiment of the hierarchical L1/L2 cross-connect of the present invention is illustrated between line cards 100,150 connected by a packet bus 164 and a TSI bus 162. The line cards 100,150 can be configured in a chassis with a backplane through which the packet bus 164 and TSI bus 162 operate. FIG. 7 depicts an example of L2 cross-connects between a pair of L2 cards 100 and a L1 card 150. The L2 card 100 includes a network processing unit (NPU) 110, a TSI field programmable gate array (FPGA) 120, connections to the backplane including the packet bus 164 and TSI bus 162, and front panel ports for Ethernet inputs.

The L1 card 150 includes a L1 cross-connect 160 configured to cross-connect VCGs between any port on the L1 card 150, ports on any other L1 card 150 through the TSI bus 162 on the backplane, and ports on any L2 card 100 through the TSI bus 162 on the backplane. The TSI FPGA 120 on the L2 card 100 is configured to transmit and receive L1 timeslots carrying L2 traffic from one or more L1 card 150.

The NPU 110 is cross-connects Ethernet Channels/Logical Ports (Leth/Lport) between physical ports. A first Leth/Lport 130 is available as a logical port representing remote L2 cards 100 on the packet bus 162. This Leth/Lport 130 can provide statistics and status monitoring of the remote card 100. Another Leth/Lport 132 represents the collection of timeslots from the L1 card 150. Here, all of the front ports on the L1 card 150 are available through this Leth/Lport 132 for L2 cross-connects through the NPU 110. For each physical port on the L2 card 100, there is a corresponding Leth/Lport 134,136,138 available for L2 cross-connects through the NPU 110.

FIG. 7 illustrates three example L2 cross-connects. First, a L2 cross-connect 102 connects a port on the second L2 card 100 with a port on the first L2 card 100 through the packet bus 164. Another L2 cross-connect 104 connects a port on the L2 card 100 with on a collection of timeslots on the L1 card 150. Finally, a L2 cross-connect 106 connects the port 134 with port 136 on the same L2 card 100.

Figure 8:
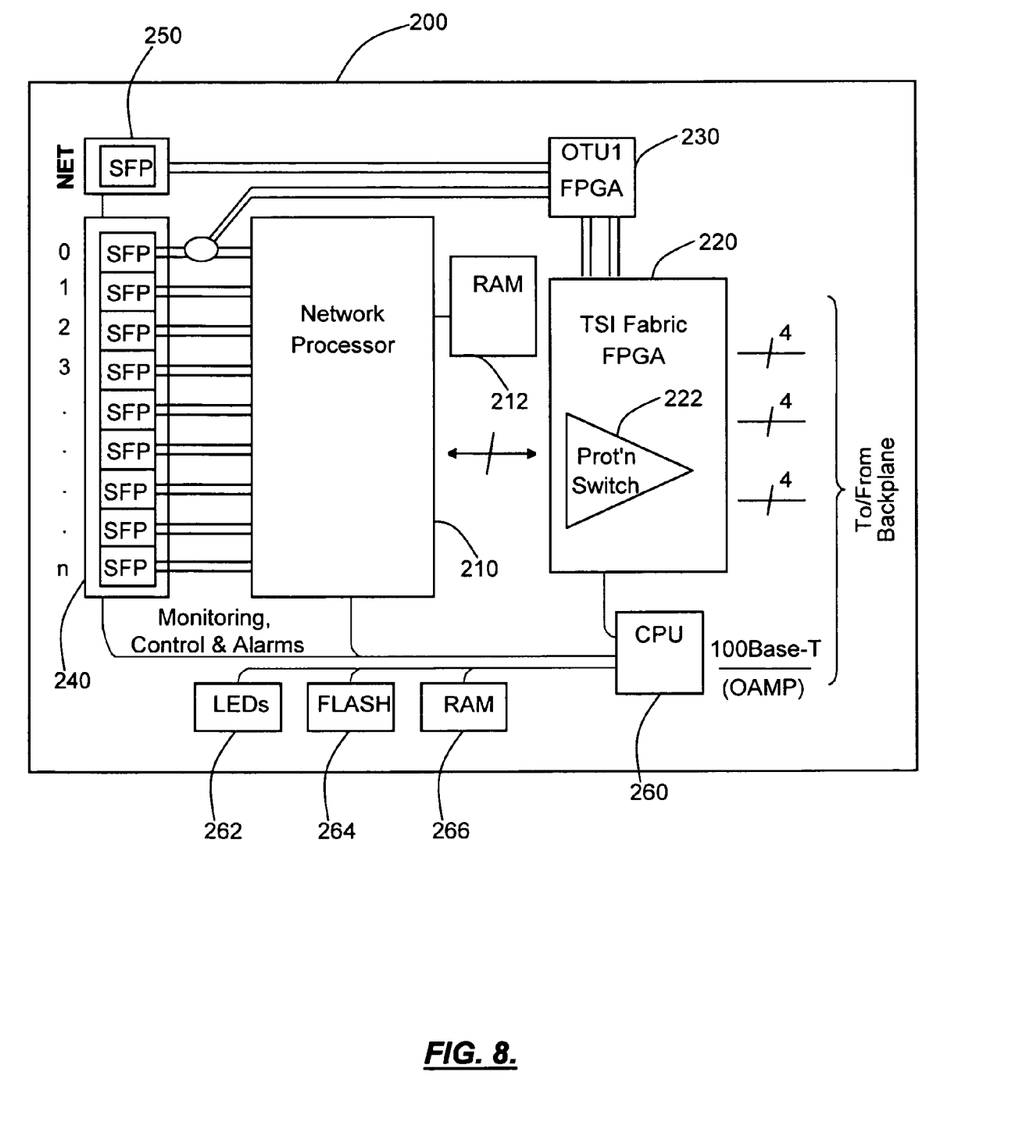
FIG. 8 illustrates an exemplary block diagram of a line card configured to provide hierarchical L1/L2 cross-connects according to the present invention.

Referring to FIG. 8, an exemplary block diagram of a line card 200 configured to provide hierarchical L1/L2 cross-connects according to the present invention is depicted. The line card 200 can include 1 to n SFP modules 240 to receive client signals. The SFP modules 240 connect to a network processor 210. The network processor 210 includes a full-duplex L2 switching/forwarding engine between the SFPs 240 and the backplane VCGs. In an exemplary embodiment, the network processor 210 is capable of 10 Gbps full-duplex (20 Gbps simplex) L2 switching and forwarding.

The TSI fabric FPGA 220 interfaces to and from a backplane. The backplane can include electrical or optical connections through which the line card 200 communicates with other line cards 200 and L1 line cards. The TSI fabric FPGA 220 includes a protection switch 222 to provide signal protection to/from the backplane. The TSI fabric FPGA 220 is configured to route signals to/from the network processor 210 to other devices through the backplane.

As described herein, the line card 200 is configured to perform L2 cross-connecting in a hierarchical fashion with attached L1 line cards configured to perform L1 cross-connecting. In an exemplary embodiment, the TSI fabric FPGA 220 is capable of terminating up to twenty VCGs in total among up to three other line cards to which the FPGA 220 can connect through the backplane. Each VCG can scale from a single 155 Mbps timeslot to a concatenation of up to sixteen, mapped into a channelized OTU2. Multi-timeslot concatenated VCGs can be from any collection of contiguous or non-contiguous timeslots. Each line card 200 can be capable of terminating up to 10 Gbps from the VCGs on the backplane to each L1 line card.

Multiple line cards 200 can be connected together through the backplane and the TSI fabric FPGA 220 to form a single L2 switch. For example, each line card 200 can support 12.5 Gbps to the backplane through a 4×3.125 interface. In an exemplary configuration, two line cards 200 can be connected through the backplane for a total of n×GbE ports (one GbE per SFP module 240) and n Gbps of OTN VCGs.

Additionally, the line card 200 includes a network SFP 250 configured to provide an aggregate output, such as an OTU1 with aggregated Ethernet traffic from the SFPs 240. An OTU1

FPGA 230 communicates to the network SFP 250 and to the TSI fabric FPGA 220 to transmit and receive the aggregated Ethernet traffic. The OTU1 FPGA 230 performs OTN framing to create an OTU1.

The line card 200 also includes random access memory (RAM) 212 attached to the network processor 210 for storage of the network processor 210 instructions and data. A central processor unit (CPU) 260 provides control of all the functions on the line card 200 including monitoring, control, and alarms. The CPU 260 can include a 100Base-T interface for external operations, administration, maintenance, and provisioning (OAM&P), and it can communicate to RAM 266, flash memory 264, and control light emitting diodes (LEDs) for a visual representation of the line card 200 status.

Figure 9:
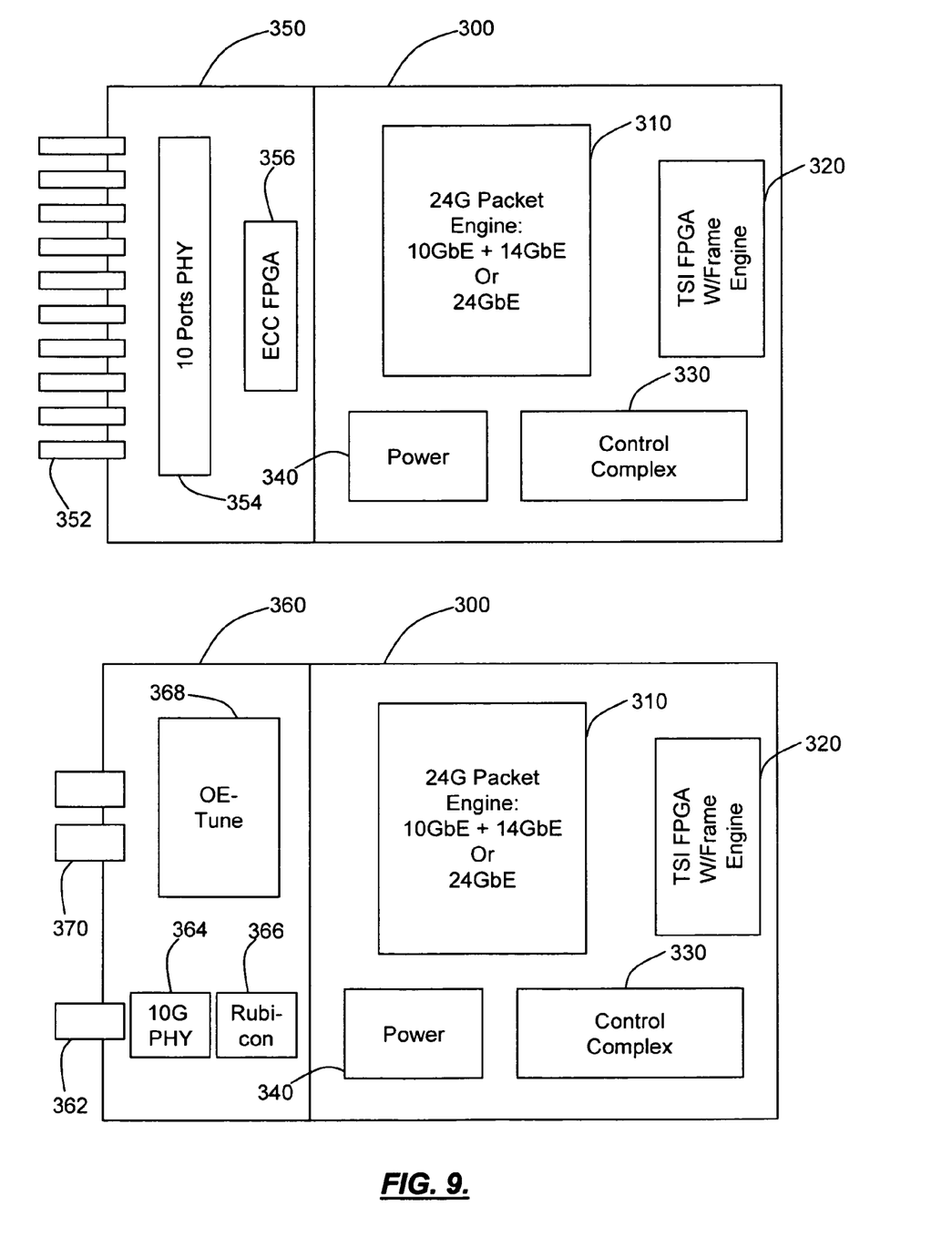
FIG. 9 illustrates exemplary block diagrams of line cards configured to provide hierarchical L1 /L2 cross-connects according to the present invention.

Referring to FIG. 9, exemplary block diagrams of a line card 300 with different input modules 350,360 configured to provide hierarchical L1/L2 cross-connects according to the present invention are depicted. The same line card 300 can be front-ended with different input modules 350,360 for GbE or 10 GbE/OTU2 connections. The line card 300 provides higher aggregate L2 switching capacity over the line card 200 depicted in FIG. 8. The line card 300 includes a 24 Gbps Packet Engine 310 configured to support a single 10 GbE plus 14 GbE or 24 GbE worth of capacity for switching/forwarding between input modules 350,260 and a backplane.

A TSI FPGA with Frame Engine 320 interfaces to the backplane and the packet engine 310 to allow the line card 300 to operate with other line cards 300 in a single L2 switch or other L1 line cards. As described herein, the TSI FPGA 320 transmits and receives multiple VCGs from other cards and interfaces them to the packet engine 310 for processing. Multiple line cards 300 can be connected together through the backplane and the TSI fabric FPGA 320 to form a single L2 switch. The line card 300 includes additional functions, such as power 340 and a control complex 330 to manage the card 300 functions and OAM&P.

The input module 350 can support GbE inputs (e.g., ten SFP modules 352), and includes a 10 Ports PHY controller 354 and an ECC FPGA 356 to interface to the line card 300. Note, the input module 350 and the line card 300 can be include in a single line card, as can the input module 360 and the line card 300. The input module 360 can support a single 10 GbE input 362 and 2 OTU2 inputs 370. An Optical Ethernet Module 368 is configured to process Ethernet streams in the OTU2 inputs 370 and provided the to the packet engine 310. A 10 G PHY controller 364 interfaces to the 10 GbE input 362, and a Rubicon module 366 provides the 10 GbE to the packet engine 310.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A hierarchical layer one and layer two cross-connect in a transport and aggregation platform, comprising
   a layer one line card comprising a plurality of ports and a layer one cross-connect configured to cross-connect a plurality of time slots;
   a layer two line card comprising a plurality of ports and a layer two cross-connect configured to cross-connect at least a portion of one or more of the plurality of time slots to one of another of the plurality of time slots and to one of the plurality of ports on the layer two line card;
   a connection between the layer one line card and the layer two line card; and,
   a second layer two line card comprising a second plurality of ports and a second layer two cross-connect configured to cross-connect at least a portion of one or more of the plurality of time slots to one of another of the plurality of time slots, to one of the second plurality of ports on the second layer two line card, and to one of the plurality of ports on the layer two line card;
   wherein the second layer two line card connects to the layer one line card and the layer two line card through the connection.

2. The hierarchical layer one and layer two cross-connect of claim 1, wherein the connection comprises a backplane.

3. The hierarchical layer one and layer two cross-connect of claim 1, wherein the layer two line card further comprises an Optical Transmission Unit of level 1 port for transporting aggregated, shaped Ethernet traffic.

4. The hierarchical layer one and layer two cross-connect of claim 1, wherein the layer two line card further comprises an Optical Transmission Unit of level 2 port for transporting aggregated, shaped Ethernet traffic.

5. The hierarchical layer one and layer two cross-connect of claim 1, wherein the plurality of ports are configured to transmit and receive any of Ethernet signals comprising 10/100/1000Base-TX, 100Base-FX, 1000Base-SX/LX/EX/CWDM, 10 GBase-SX/LX/EX/CWDM (including LAN or WAN PHY) with the same hardware.

6. The hierarchical layer one and layer two cross-connect of claim 1, wherein the time slots comprise 155 Mbps.

7. The hierarchical layer one and layer two cross-connect of claim 1, wherein the layer one line card is configured to send and receive a portion of the plurality of time slots to the layer two line card.

8. The hierarchical layer one and layer two cross-connect of claim 7, wherein the layer two line card encapsulates Ethernet frames into a Generic Framing Procedure—Frame.

9. The hierarchical layer one and layer two cross-connect of claim 8, wherein the layer one line card maps a plurality of time slots and one or more Generic Framing Procedure—Frames into an Optical Transport Network payload.

10. The hierarchical layer one and layer two cross-connect of claim 9, wherein the Optical Transport Network payload comprises one of an Optical Transmission Unit of level 1 or an Optical Transmission Unit of level 2.

11. The hierarchical layer one and layer two cross-connect of claim 1, wherein the layer two line card is configured to send and receive traffic to and from a Virtual Concatenation Group residing in one of the plurality of ports on the layer one line card.

12. The hierarchical layer one and layer two cross-connect of claim 11, wherein the Virtual Concatenation Group comprises one to sixteen timeslots.

13. A transport and aggregation platform utilizing a hierarchical layer one and layer two cross-connect, comprising:
   a backplane for connecting line cards together;
   a layer two line card comprising a connection to the backplane, a plurality of client ports, a layer two cross-connect, and a layer one interface; and
   a layer one card comprising a connection to the backplane, a plurality of flexible protocol and rate client ports, and a layer one cross-connect;
   wherein the layer one card is configured to transmit and receive a plurality of times slots on the plurality of flexible protocol and rate client ports, and perform switching of the time slots and layer two, and wherein further the layer one cross-connect is configured to route portions of one or more of the plurality of time slots through the backplane to the layer one interface;

wherein the layer two card is configured to switch layer two signals from the plurality of client ports on the layer two card and layer two signals from the portions of one or more of the plurality of time slots to one of another portion of one or more of the plurality of time slots or to another of the plurality of client ports on the layer two card.

* * * * *